F. SWALES.
MOUTH GAG FOR HORSES AND OTHER ANIMALS.
APPLICATION FILED MAR. 13, 1914.
1,130,346.
Patented Mar. 2, 1915.
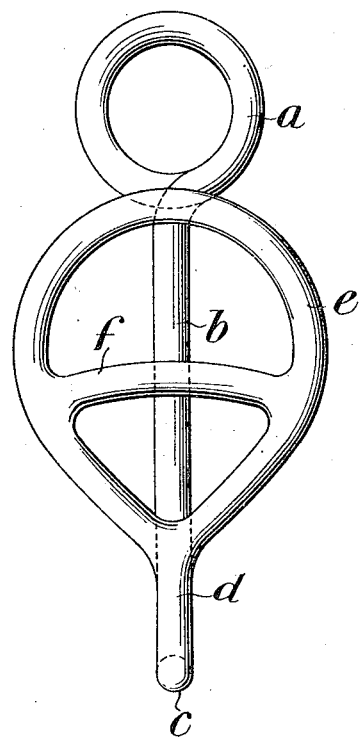
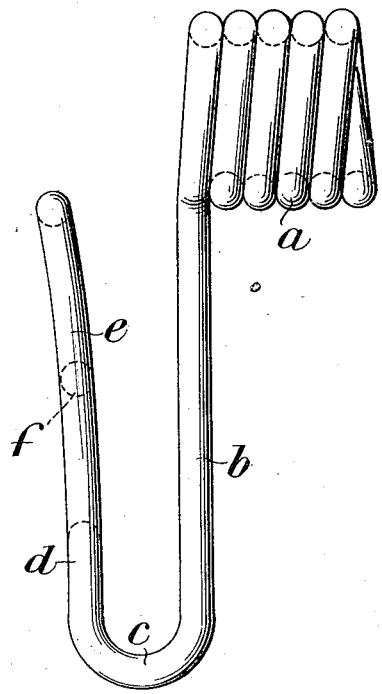
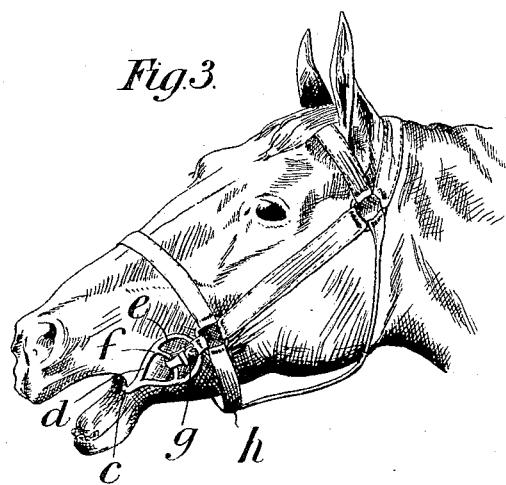
WITNESSES.
INVENTOR.
Frank Swales.

UNITED STATES PATENT OFFICE.

FRANK SWALES, OF HOLLOWAY, LONDON, ENGLAND.

MOUTH-GAG FOR HORSES AND OTHER ANIMALS.

1,130,346. Specification of Letters Patent. Patented Mar. 2, 1915.

Application filed March 13, 1914. Serial No. 824,376.

*To all whom it may concern:*

Be it known that I, FRANK SWALES, a subject of the King of Great Britain, residing at 33 Hertslet road, Holloway, London, England, have invented a new and useful Improved Mouth-Gag for Horses and other Animals, of which the following is a specification.

This invention relates to mouth gags for keeping open the mouths of animals during operations on the mouth or teeth or while administering medicine.

It has heretofore generally been the practice when gagging horses to employ what are termed balling irons, speculums, or gags which are applied between the upper surface of the tongue and the roof of the mouth and which therefore inflict considerable pain and injury on the animal, and usually the services of three persons were required, namely, one to hold the animal's head, another to hold the device and another to administer the medicine or to operate.

With my invention the above objections are overcome by so constructing the gag that when applied the main inner portion is between the upper and lower molars while the gag can be quickly placed in position between the teeth or dislodged therefrom by the operator himself without assistance owing to the entire absence of springs, bolts, screws, sliding bars or the like. The said main inner-portion is carried by a rod which connects the inner with the outer portion and is adapted to lie between the inner surface of the animal's cheek and the outer side of the lower molars and extends to the angle of the mouth when it turns outward and upward in a direction parallel with the connecting portion of the said rod. The outer part of the rod is bent into a circular shape so as to serve as a handle for the operator and a safeguard for keeping the jaws of the animal in the normal position. The main inner portion of the gag must be strong enough to withstand the pressure of the animal's molar teeth, when the jaws are tightly pressed against it, and for this reason it is advantageous to form the said portion by coiling the wire of which the connecting rod is a part into a tubular form projecting at a right angle from the connecting rod.

To enable my invention to be fully understood I will describe it with reference to the accompanying drawing, in which:—

Figure 1 is a front view, and Fig. 2 is a side view of a mouth-gag for horses and other animals constructed according to my invention. Fig. 3 is a view illustrating the use of the invention.

$a$ is the main inner portion of the gag designed to be introduced between the animal's upper and lower molar teeth, and $b$ is the rod which carries the same and lies between the cheek and the lower molar teeth, the said portion being formed by coiling the wire of which the rod $b$ is a part into the form of a tube projecting at a right angle from the rod $b$ as clearly shown in Fig. 1. The rod $b$ extends downward from the tube $a$ and then curves outward at $c$ and upward at $d$ parallel with the part $b$ when it is formed into the shape of a ring $e$, Fig. 2, designed to lie against the outer surface of the animal's cheek and whereby the gag is held by the operator when inspecting the animal's mouth or administering medicine, which he can easily do without assistance. The ring $e$ is provided with a bar $f$ to receive a strap $g$, Fig. 3, whereby the gag can be attached to the halter $h$ when operating on the teeth.

Claims:

1. A gag for horses and other animals, comprising a part extending within the mouth longitudinally of the animal's head and beyond the corner of the mouth, a part extending inwardly therefrom and adapted to lie between the upper and lower molar teeth and a support secured to the longitudinally extending part and projecting outside of the animal's mouth when the device is in use.

2. A gag for horses and other animals constructed of a main inner portion designed to be introduced between the animal's upper and lower molar teeth, a rod carrying the said main inner portion and adapted to lie between the animal's cheek and outer side of the lower molars, and an outer portion designed to lie against the outer side of the animal's cheek and to be held by the operator, substantially as set forth.

3. A gag for horses and other animals constructed of a main inner portion designed to be introduced between the animal's upper and lower molar teeth, a rod carrying the said main inner portion and adapted to lie between the animal's cheek and outer side of the lower molars, and an outer portion designed to lie against the outer side of the animal's cheek and to be held by the operator, the said outer portion being formed into a ring whereby the gag can be held by the operator, substantially as set forth.

4. A gag for horses and other animals constructed of a main inner portion designed to be introduced between the animal's upper and lower molar teeth, a rod carrying the said main inner portion and adapted to lie between the animal's cheek and outer side of the lower molars, and an outer portion designed to lie against the outer side of the animal's cheek and to be held by the operator, the said outer portion being formed into a ring whereby the gag can be formed by the operator, and the ring being provided with a bar for receiving a strap whereby the gag can be attached to the animal's halter when required, substantially as set forth.

5. A gag for horses and other animals constructed of a main inner portion designed to be introduced between the animal's upper and lower molar teeth, a rod carrying the said main inner portion and adapted to lie between the animal's cheek and the outer side of the lower molars, and an outer portion designed to lie against the outer surface of the animal's cheek and to be held by the operator, the said main inner portion being formed by coiling the wire of which the rod is a part into the form of a tube projecting at a right angle to the said rod, substantially as set forth.

FRANK SWALES.

Witnesses:
A. ALBUTT,
M. M. FREEMAN.

Copies of this patent may be obtained for five cents each, by addressing the "Commissioner of Patents, Washington, D. C."